United States Patent [19]
Moorhead et al.

[11] Patent Number: 5,935,722
[45] Date of Patent: Aug. 10, 1999

[54] LAMINATED COMPOSITE OF MAGNETIC ALLOY POWDER AND CERAMIC POWDER AND PROCESS FOR MAKING SAME

[75] Inventors: Arthur J. Moorhead, Knoxville, Tenn.; Hyoun-Ee Kim, Seoul, Rep. of Korea

[73] Assignee: Lockheed Martin Energy Research Corporation, Oak Ridge, Tenn.

[21] Appl. No.: 08/922,940

[22] Filed: Sep. 3, 1997

[51] Int. Cl.$^6$ ....................................................... G11B 5/66
[52] U.S. Cl. .............................. 428/694 B; 428/694 BA; 428/694 BH; 428/545; 428/570; 428/900; 427/383.5; 419/10; 419/19; 419/30; 419/35; 419/42; 419/49; 264/113; 264/125; 148/105; 148/121; 148/217
[58] Field of Search .................. 478/694 B, 694 BA, 478/694 BH, 900, 545, 570; 427/383.5; 419/10, 19, 30, 35, 42, 49; 264/113, 125; 148/105, 121, 217

[56] References Cited

U.S. PATENT DOCUMENTS

| | | | |
|---|---|---|---|
| 5,063,011 | 11/1991 | Rutz et al. | 264/126 |
| 5,198,137 | 3/1993 | Rutz et al. | 252/62.54 |
| 5,268,140 | 12/1993 | Rutz et al. | 75/246 |
| 5,300,317 | 4/1994 | Ivarson | 427/195 |
| 5,679,473 | 10/1997 | Murayama | 428/694 T |
| 5,763,085 | 6/1998 | Atarashi | 428/403 |

OTHER PUBLICATIONS

"Engineered Materials Handbook", vol. 4, Ceramics and Glasses, 1991, pp. 495–497, 499.

*Primary Examiner*—Leszek Kiliman
*Attorney, Agent, or Firm*—Quarles & Brady LLP

[57] ABSTRACT

A laminated composite structure of alternating metal powder layers, and layers formed of an inorganic bonding media powder, and a method for manufacturing same are disclosed. The method includes the steps of assembling in a cavity alternating layers of a metal powder and an inorganic bonding media of a ceramic, glass, and glass-ceramic. Heat, with or without pressure, is applied to the alternating layers until the particles of the metal powder are sintered together and bonded into the laminated composite structure by the layers of sintered inorganic bonding media to form a strong composite structure. The method finds particular application in the manufacture of high performance magnets wherein the metal powder is a magnetic alloy powder.

13 Claims, 8 Drawing Sheets

| ID | $H_c(Oe)$ | $B_s(KG)$ | $\mu_i$ | $\mu_{max}$ | Loss(W/Kg) f = 400 Hz | Metal Layers (#layer/thickness) |
|---|---|---|---|---|---|---|
| L-1 | 1.74 | 21.8 | 4831 | 5631 | 206 | 3/ 0.7mm |
| L-2 | 1.93 | 18.5 | 2226 | 3079 | 359 | 4/ 0.5mm |
| L-3 | 2.38 | 17 | 2372 | 2449 | 809 | 5/ 0.35mm |

Thickness of Y-PSZ layer: Approx. 0.2mm

*FIG. 7*

LAMINATED COMPOSITE OF MAGNETIC ALLOY POWDER AND CERAMIC POWDER AND PROCESS FOR MAKING SAME

CROSS REFERENCE TO RELATED APPLICATIONS (Not Applicable)

STATEMENT REGARDING FEDERALLY SPONSORED RESEARCH OR DEVELOPMENT

This invention was made with government support under contract DE-ACO5-96OR22464, awarded by the United States Department of Energy to Lockheed Martin Energy Research Corporation, and the United States Government has certain rights in this invention.

BACKGROUND

1. Field of the Technology

This invention concerns metal composite materials, and more particularly a laminated composite of a metal powder and a ceramic, glass or glass-ceramic powder bonding agent.

2. Description of the Prior Art

Magnetic materials can be classified into two groups with either hard or soft magnetic characteristics. Hard magnetic materials retain a large amount of residual magnetism after exposure to a strong magnetic field. In contrast, soft magnetic materials become magnetized by relatively low-strength magnetic fields, and return to a state of low residual magnetism when the applied field is removed. Soft magnetic behavior is essential in any application involving changing electromagnetic induction such as solenoids, relays, motors, generators, magnetic bearings, gyroscopes, transformers, and magnetic shielding. The most desirable characteristics in magnetically soft materials include: high permeability, high saturation induction, low hysteresis-energy loss, and low eddy-current loss in alternating flux applications. Other factors such as cost, availability, strength, corrosion resistance, and ease of processing also influence the final selection of a soft magnetic material. Thus, for many applications, the relatively low cost irons or steels are used. Pure iron has a saturation induction of 2.16 Tesla (21.58 kilogauss); a value sufficient for many applications. However, some applications demand the higher saturation values that can only be achieved in alloys of iron and cobalt. The highest known saturation induction value is 2.46 T (24.6 kG) which occurs in an Fe-Co alloy containing about 35 wt. % cobalt. Because of the high cost of cobalt, such high performance magnetically soft materials tend to be used in only the most demanding applications. For example, the majority of transformers, motors, and generators have cores of high-purity iron, low-carbon iron, silicon steel, or nickel-iron alloys. However, for very high performance transformers, transducers, electrical generators, and magnetic bearings, the material of choice for the core laminations is one of the iron-cobalt alloys. According to a chapter in the ASM Metals Handbook (Douglas W. Dietrich in Tenth Edition, Volume 2, Properties and Selection; Nonferrous Alloys and Special-Purpose Materials, p 774), the iron-cobalt alloys are used in radar pulse transformers, transducers, electromagnet pole tips, and high-output power generators. Experience has shown that transformers containing iron-cobalt alloys are generally used in very specialized instruments including those procured by the military. The power generators that use these materials include those in commercial and military aircraft.

The cores of motors, generators, transformers and magnetic bearings are generally comprised of a large number of thin metal laminations that are separated from one another by a layer of insulating material. In the highest performance magnetic cores, the metal laminations are comprised of one of two iron-cobalt alloys (Fe-49Co-2V or Fe-27Co-0.6Cr). The interlaminar insulation, which may consist of an oxide layer on the metal plus an organic adhesive layer between laminations, is necessary to ensure high electrical efficiency in the magnetic core. Presently, the most demanding applications for those core assemblies are those used in airborne power generators.

Airborne power generation requires compact, high-output equipment and thus a lamination material with the highest saturation induction and lowest hysteresis losses, i.e., an iron-cobalt alloy. The high rotational speeds in these devices, on the order of 12,000 rpm, impose significant mechanical stresses on the rotor material as well as the adhesive that bonds the laminates. In fact, the yield strength of the magnetic rotor material may be the decisive factor in alloy selection for this application, and it is highly desirable that the strength of the adhesive bond be comparable with that of the magnetic material.

There are presently under development two new demanding applications for magnetic materials—compact, very high speed electrical generators; and high-temperature magnetic bearings. The proposed generators spin at speeds on the order of 100,000 rpm, resulting in high stresses on the foil laminates and the adhesives joining them.

The high-temperature magnetic bearings are being considered for future gas turbine engines. Magnetic bearings could increase the reliability and reduce the weight of these engines by eliminating the lubrication system. They could also increase the DN (diameter of the bearing times rpm) limit on engine speed, and allow active vibration cancellation systems to be used—resulting in a more efficient, "more electric" engine. The magnetic bearing is similar to an electric motor. It has a laminated rotor and stator, likely made of an iron-cobalt alloy. Wound around the stator are a series of electrical wire coils that form a series of electric magnets around the circumference. The magnets exert a force on the rotor. A probe senses the position of the rotor, and a feedback controller keeps it in the center of the cavity. For gas turbine applications, it is desirable that the magnetic bearings be capable of operating at temperatures on the order of 650° C.

Unfortunately, organic adhesives lose much of their strength at relatively modest temperatures. For example, according to a chapter by John Williams in the ASM Engineered Materials Handbook, Volume 1, Composites, 1987 ("Adhesives Selection,"p. 684) the maximum use temperatures for organic adhesives range from 82° C. for epoxies to 260° C. for some polyimides.

The strength of magnetic rotor assemblies can be enhanced by the addition of metal pins or stakes that are inserted into holes punched in the laminations. However, there is a penalty in electrical efficiency for the use of such devices since the lamination factor (solidity of the core) is reduced when the magnetic lamination material is replaced by a non-magnetic material.

Thus, there is a need for a method to strongly bond together the magnetic laminations of the cores of high performance electromagnetic equipment without the strength and temperature limitations of organic adhesives. Further it would be desirable to provide a method for avoiding the need for mechanical staking presently used to fabricate such magnetic structures, and to replace such method with a stronger, more efficient design.

Another problem occurs when it is desired to fabricate a large magnetic core assembly with the laminations in a "pancake" geometry in order to attain certain magnetic-field effects. In such a case, the diameter of the core is limited by the maximum width of foil available, which for Hiperco 50A is about 40 cm (16 inches). One alternative is to change the coil design to one in which a long, narrow length of foil is wrapped in a spiral configuration, but that is not always desirable from a magnetic performance standpoint.

A further problem associated with metal foil laminations is that certain alloys are too brittle to roll into foils. For, example, the Fe-6.5Si alloy is known to possess excellent magnetic properties (high permeability and low hysteresis losses) but is too brittle to process into foil. Thus, it would be desirable to provide a method for manufacturing high performance magnets in sizes precluded by the available widths of foil, or which would allow the use of alloys formed of compositions that are too brittle to roll into foil.

SUMMARY OF THE INVENTION

A laminated composite structure and method of manufacturing same. The composite structure is comprised of alternating layers of metal powder and an inorganic bonding media selected from at least one of the group of powders consisting of ceramic, glass or glass-ceramic. The method comprises the steps of assembling in a cavity alternating layers of a metal powder and an inorganic bonding media powder selected from at least one of the group of powders consisting of a ceramic, glass, and glass-ceramic. Heat, with our without pressure, is applied to the alternating layers until the particles of the metal powder are sintered together and bonded into the laminated composite structure by the layers of sintered inorganic bonding media. When the bonding agent is selected from one of the group consisting of glass and glass-ceramic, the particles comprising the metal powder may be oxidized prior to the step of applying heat in order to enhance the wetting and bonding behavior.

The powder comprising the metal layer of the laminated composite structure is preferably a magnetic alloy when the composite is to be used in manufacture of a magnetic core. However, other metal particles could be used under the process of this invention. For example, there is a series of well known controlled-expansion Fe-Ni-Co alloys (including Alloy 903, 907, and 909) that were all designed to provide high strength and low coefficient of thermal expansion for applications up to 650° C. These advantages have been used by the aerospace industry to, for example, provide closer clearance between the tips of rotating turbine blades and retainer rings. However, because they do not contain an element such as chromium (to form a protective surface oxide), these alloys are susceptible to oxidation in high-temperature atmospheres. The processes of this invention would provide a means for attaching oxidation resistant surface layers to a core of a structural metal such as Alloy 909.

The layered compact may be densified and bonded into a composite structure through the application of temperature alone, or through application of both temperature and pressure. In pressure-less sintering, densification occurs without an effective stress other than that generated by surface energy sources. Pressure-assisted sintering techniques employ combinations of temperature and stress to speed up the densification process and to ensure the elimination of residual pores. The simultaneous heating and pressurization events add cost and complexity that are best justified by the increased performance that comes from a higher final density.

In one embodiment, the alternating powder layers are densified through a pressure-assisted technique which uses a uniaxial hot pressing process in a rigid, closed die comprised of a material such as graphite. In a second, alternative, embodiment, high-pressure gas is used to transfer heat and pressure through a flexible die to bring about densification and bonding of the laminated composite structure. The latter process is widely known as hot isostatic pressing. The method of this invention finds particular application in the manufacture of high-performance magnets, wherein the metal powder is a magnetic alloy.

It is, therefore, an object of this invention to provide a method for bonding layers of magnetic alloy powder to themselves.

It is another object of the invention to bond layers of magnetic alloy powders with a powder of electrically-insulating agent that does not contain organic materials.

It is a further object of the invention to provide a composite article of densified metallic magnetic powder layers and interlaminar insulation layers, the latter of which is comprised of ceramic, glass, glass-ceramic, or mixture of two or more of the three materials.

It is also an object of this invention to provide a method for bonding densified layers of non-magnetic metal powders into a strong, composite structure.

It is another object of the invention to bond layers of non-magnetic metal powders into structures using an agent that does not contain organic- or metallic-materials.

It is a further object of the invention to provide a composite article of densified layers of non-magnetic metal powders interleaved with densified layers of a material comprised of ceramic, glass, glass-ceramic, or mixture of two or more of the three materials.

Finally, it is an object of the invention to provide a composite article comprised of one or more metallic layers and one or more non-metallic, inorganic layers comprised of ceramic, glass, glass-ceramic, or mixture of two or more of the three materials.

BRIEF DESCRIPTION OF THE DRAWINGS

FIG. 7 is a Table showing the magnetic test results for laminated magnetic composite specimens manufactured in accordance with the invention.

DETAILED DESCRIPTION

Figure 1:
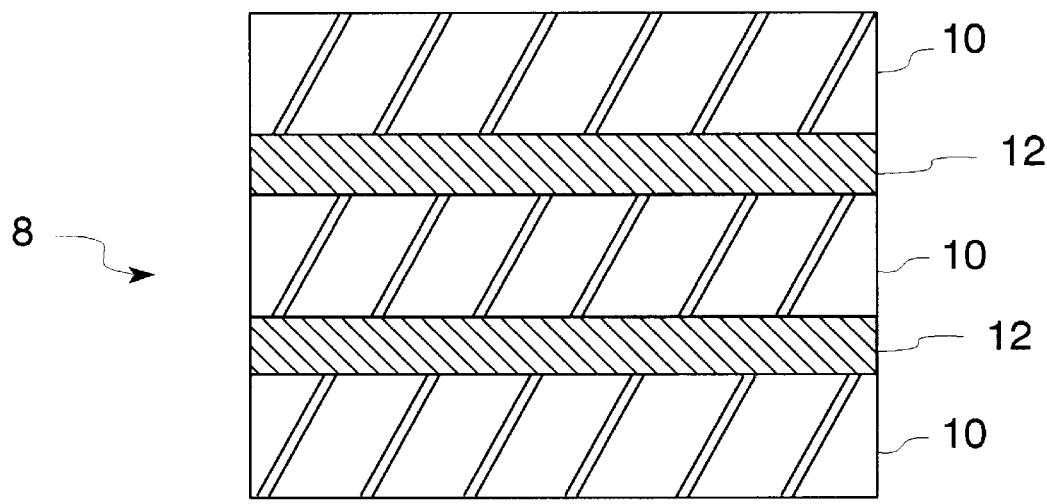
FIG. 1 is a cross-sectional view of a laminated composite according to the invention.

FIG. 1 illustrates a laminated composite structure manufactured in accordance with the present invention. As shown therein, the laminated composite 8 is comprised of alternating layers of a metal powder 10 and a powder comprised of an inorganic bonding media 12. The metal powder layers 10 are sintered together, under conditions of heat (with or without the application of pressure) and bonded into a structure by the layers of sintered inorganic bonding media 12 to form the composite structure.

The metal powder 10 is preferably comprised of a metal having high performance magnetic properties, such as high permeability, high saturation induction, low hysteresis-energy loss, and low eddy current loss in alternating flux applications. Such metals include various alloys of iron and cobalt; iron, cobalt and vanadium; or iron, cobalt and chromium. For example, 49Fe-49Co-2V powder (domestically produced as Hiperco® 50A by Carpenter Technology Corporation) has been found to provide acceptable results. Significantly, however, the invention is not limited in this regard and it may also be used with other powdered metals, or other magnetically soft alloys such as Fe-6.5Si, or structural metals such as Incoloy alloy 909 (Ni-42Fe-13Co-4.7Nb-1.5Ti-0.4Si).

The bonding media 12 is an inorganic powder comprised of a ceramic, glass, or glass-ceramic material. Examples of such materials include ceramic powder of composition 5.48 wt. % $Y_2O_3$-balance $ZrO_2$ (Grade TZ-3YS, which is commercially available from Toyo Soda Manufacturing Co. Ltd., Japan). This ceramic powder is known generically as yttria-partially stabilized zirconia or "Y-PSZ". However, other inorganic bonding media consisting of ceramic, glass or glass-ceramic materials may also be used for this purpose.

For example, glass-ceramics have several attributes that make them very useful with regard to fabrication of inorganic-bonded laminated composites under this invention. Compared with ceramics, glass-ceramics (when in the glassy state) will flow and more easily attain intimate contact with the particles of the metal layers. Compared with glasses, glass-ceramics generally have superior mechanical properties and have better corrosion resistance, because they are at least partly crystalline. Glass-ceramics have another property that makes them particularly useful in the layered composites of this invention. With proper control of crystallization, glass-ceramics can be made with a much wider range of coefficients of thermal expansion than can be achieved with glasses or conventional ceramics.

A particularly interesting group of glass-ceramics are those comprised of $Li_2O$, $Al_2O_3$, and $SiO_2$. Depending on specific composition, and crystallization species and amount, these materials can have coefficients of thermal expansion ranging from near zero to $16 \times 10^{-6}/°C$. It has been shown that under proper conditions (which may include oxidizing the surface of the metal) these wet and strongly bond to metals including Fe-Co-V alloys, stainless steels, Inconel 718, and Hastelloy C276.

In FIG. 1, there is shown a laminated composite having three layers of metal alloy powder 10 and two layers of bonding media powder 12. It should be understood however, that the invention is not limited in this regard, and greater or fewer alternating layers 10, 12 may be formed as may be suitable for a particular application.

Figure 2:
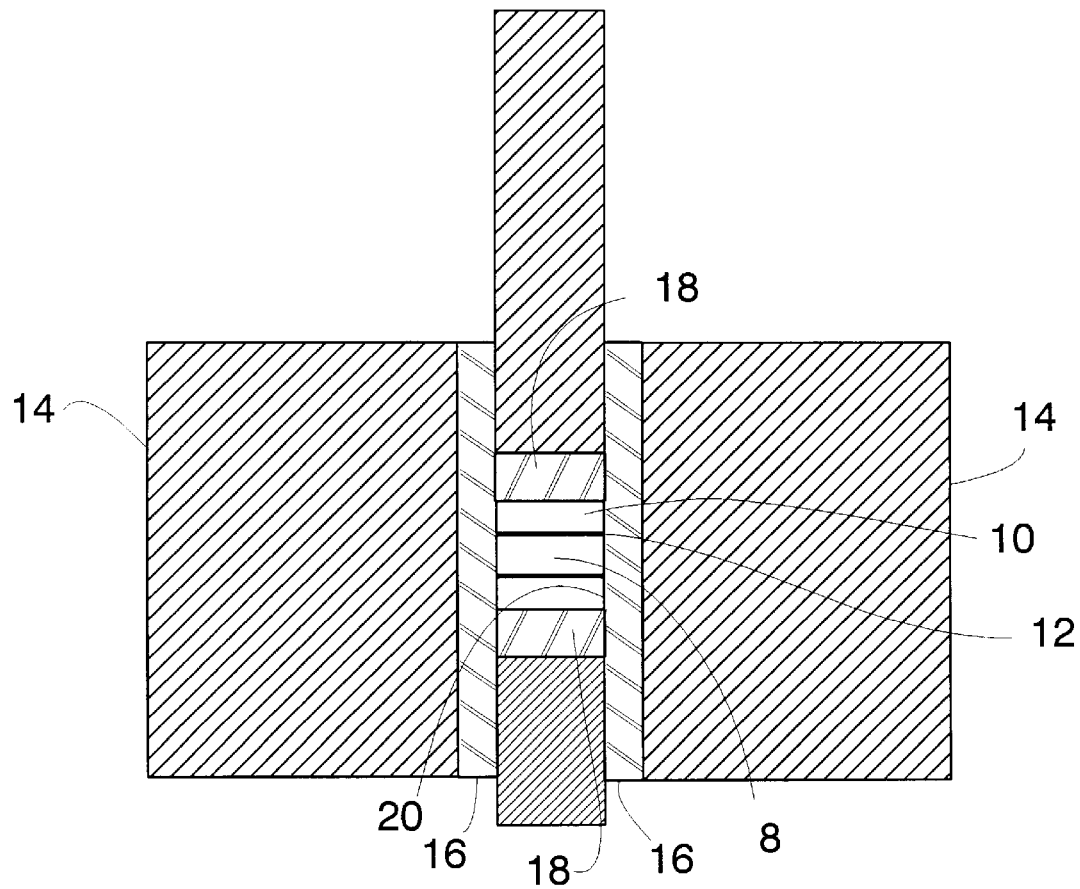
FIG. 2 is a cross-sectional view of a die in which alternating layers of a metal powder and an inorganic bonding media have been arranged prior to densification by uniaxial hot pressing.
Figure 3:
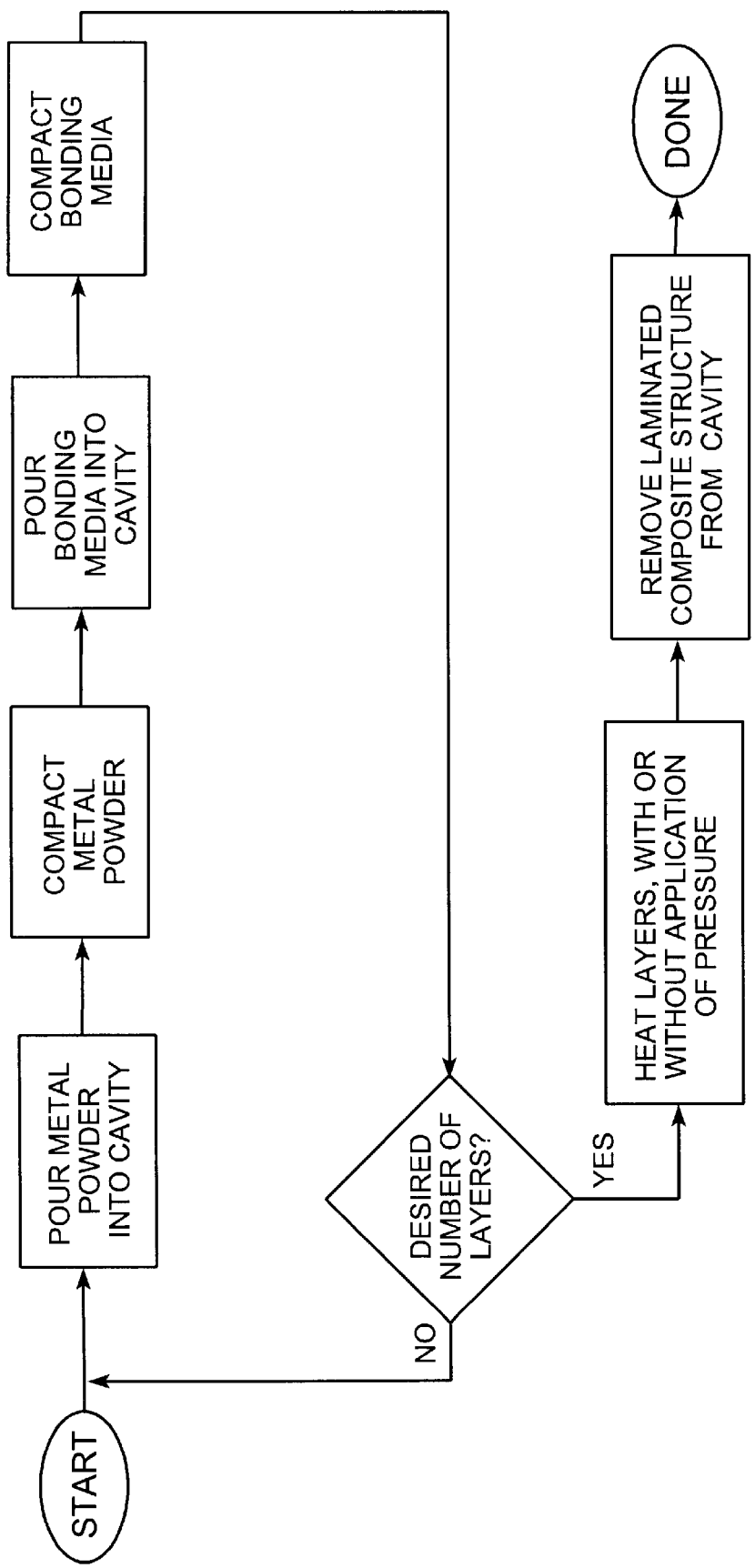
FIG. 3 is a flow chart illustrating the process for forming the laminated composite in FIG. 1.

The process for manufacturing the laminated composite in FIG. 1 shall now be described in reference to FIGS. 2 and 3. As shown in FIGS. 2 and 3, the laminated composite is formed by a series of steps beginning with the pouring of a metal powder into a cavity 20. The cavity 20 is preferably provided in the form of a rigid die 14 formed of graphite or some other suitable material. If the die is formed of graphite, a boron nitride sleeve 16 is preferably provided as shown in FIG. 2 to prevent a reaction between the metal powder and the graphite. Similarly, a boron nitride disk 18 can be provided on the bottom of the alternating layers and on top thereof, once they are in place. FIG. 2 shows the arrangement of the boron nitride components.

Once the metal powder 10 has been poured into the cavity 20, it is preferably compacted by suitable means such as vibration and tamping. After this step is complete, a bonding media powder 12 is poured into the cavity 20 on top of the metal powder 10. The powder layers are again compacted and the steps are repeated until a desired number of lamination layers has been achieved.

It should be understood, that the invention is not limited to a laminated composite in which the outer surfaces are comprised of densified metal powder layers. In some applications it is desirable to have the surface layers of the composite composed of a non-metallic, inorganic material (ceramic, glass, or glass-ceramic), and in those cases the inorganic layer would be placed in the die cavity first. There are also applications in which it is desirable to have ceramic, glass, or glass-ceramic on one surface and a metal on the other. In such a case ceramic, glass, or glass-ceramic powder could be placed into the die as the first layer and metal powder as the last layer.

The specific bonding media chosen is preferably a powder formed of an inorganic insulating material such as ceramic, glass, or glass-ceramic. In a preferred embodiment, the bonding media 12 is selected so that its coefficient of thermal expansion approximates that of the metal powder 10. In this way, stresses and defects due to varying rates of contraction and expansion as between the metal powder 10 and the bonding media 12 can be minimized. Further, the bonding media 12 is advantageously selected to be tough and strong, with good electrical insulating characteristics to minimize eddy currents and ensure high electrical efficiency when the composite laminate is used in a magnetic core.

When the desired number of alternating layers of metal powder 10 and bonding material 12 have been provided in the die 20, the combined layers are densified and bonded together through the application of heat, with or without the addition of pressure, to cause sintering of the metal powder 10 and bonding media 12. When pressureless sintering is to be used, the compacted layered body is removed from the die and placed into a furnace for densification and bonding at elevated temperatures. Typically, if a pressureless process is to be used, one or more binder materials will have been mixed with the metal and ceramic, glass, or glass-ceramic powders prior to placing the powders into the die for compaction. The purpose of the binder is to coat the particles and provide lubrication during compaction and give the pressed part adequate strength for handling, inspection, and green machining. The binders may be organic or inorganic, but generally are organic in nature. Typical organic binders include polyvinyl alcohol, waxes, and celluloses. Organic binders normally are decomposed during the high-temperature densification step and evolved as gases.

However, some binders leave a carbon residue, especially if fired under reducing conditions.

It is well known that application of pressure during sintering accelerates the kinetics of densification by increasing the contact stress between particles and by rearranging the powder particles to improve packing. Accordingly, pressure sintering can be achieved at reduced process times and temperatures, and result in stronger bodies due to the minimization of porosity and grain growth. In addition, pressure assisted densification can be conducted starting with loose powders so that no binders are required.

If pressure is to be added, one of two processes are typically used. In one embodiment, pressure may be added to a rigid die by a mechanical process known as uniaxial hot pressing. Alternatively, a flexible die and gas pressure can be used for this purpose in a process known as hot isostatic pressing.

The time, temperature, and pressure parameters for the above processes are selected based on the values required to achieve sintering of the particles of the metal and those of the inorganic bonding agent and to develop a strong bond between the sintered layers of inorganic bonding agent and metal. Thus, it will be obvious to those skilled in the art, that the bonding parameters will be expected to vary according to the densification process being used, as well as the size, shape, specific compositions, and other properties of the materials that make up the layered composite article and other factors such as fixturing, furnace design, and furnace load.

When the laminated composite specimen 8 is removed from its cavity the layers of metal powder 10 and bonding media 12 are bonded together into a strong structure. In the case where the metal powder layers are comprised of a magnetic material, the resulting layered material has similar magnetic properties to, but is much stronger than, a conventional laminated magnet comprised of foil layers bonded together using an organic adhesive. For example, it has been shown that thin layers of yttria-partially stabilized zirconia powder can be used to bond together layers of powder of an iron-cobalt-vanadium soft magnetic alloy. The resulting structure retains the outstanding magnetic properties of this particular alloy (high magnetic saturation, high D.C. maximum permeability, low coercive force, and low A.C. core loss), but is much stronger than a comparable laminate structure comprised of foils of this alloy bonded with polymer adhesives.

The successful application of the process has been demonstrated with respect to the fabrication of strong, high performance magnets comprised of 49Fe-49Co-2V powder layers (domestically produced as Hiperco® 50A by Carpenter Technology Corporation) bonded together (and electrically isolated from each other) by interleaving layers of a ceramic powder of composition 5.48 wt. % $Y_2O_3$-balance $ZrO_2$ (Grade TZ-3YS, Toyo Soda Manufacturing Co. Ltd., Japan). As noted above, this particular ceramic powder is known generically as yttria-partially stabilized zirconia or "Y-PSZ". Densification of the metal and ceramic powder layers, and bonding of the layers together into a laminated composite structure, have been achieved by uniaxial hot pressing in a boron nitride-lined graphite die at temperatures of 1200–1250° C., and applied stress of 20 MPa (3 ksi), with a hold time of 30 minutes at the pressing temperature. The Y-PSZ powder serves as the electrical insulation material necessary to minimize eddy current core losses in the magnet core structure as well as the agent that bonds the metal powder layers into a strong, dimensionally-stable body. As noted above, it has been determined that the insulating material can also be a glass or glass-ceramic. In such cases where glass or glass-ceramic bonding media is used, however, it may be necessary to oxidize the surface of the magnetic alloy powder particles prior to lamination in order to enhance the wetting and bonding behavior of the glassy material.

The compositions and processes described in the following examples are intended to be illustrative of, and not in any way a limitation on, the scope of the invention. Persons of ordinary skill in the art should be able to envision variations on the general principles of this invention that fall within the scope of the generic claims that follow.

EXAMPLE 1

A series of laminated samples were prepared by placing alternate layers of metal powder and ceramic powder in a graphite die and pressing at elevated temperature. The purpose of the ceramic powder was to bond the metal powder layers into a structure while maintaining electrical isolation between the metal powder layers. A commercially available soft magnetic Fe-Co-V alloy powder (Hiperco 50A, Carpenter Technology Corp., Reading, Pa.) was used in the samples. The magnetic alloy powder had a composition of 48.7% Co, 1.9% V and balance Fe, by weight, and was in the form of –325 mesh powder. The ceramic powder, yttria-partially stabilized zirconia was chosen for these samples because its coefficient of thermal expansion approximates that of the metal, and because, when densified, it is a strong, tough ceramic with good electrical insulating properties. The Y-PSZ powder (Grade TZ-3YS, Tosoh Corporation, Japan) had composition of 5.48 wt. % $Y_2O_3$-$ZrO_2$. The average particle size of the Y-PSZ powder was 0.04 micrometers. A boron nitride sleeve, and boron nitride disks on the top and bottom of the specimen, were placed in the graphite die to prevent reaction between the metal powder and the graphite, as illustrated in FIG. 1. The inside diameter of the die was 28 mm. First, about 3 grams of the Hiperco 50A powder was poured into the die. The die assembly was vibrated to consolidate the powder, with further compaction achieved by pressing the metal powder with a steel punch. A thin layer of ceramic powder (about 0.5 to 1.0 g in mass) was poured onto the surface of the metal powder layer and subsequently compacted using the steel punch. This process was repeated up to 5 times, in which case the resultant specimen had 5 layers of magnetic alloy powder interleaved with 4 layers of ceramic powder. The specimens were hot pressed in vacuum under an applied stress of 20.7 MPa (3 ksi), with a 30 minute hold at a final temperature of 1200° C. The thickness of the Y-PSZ layer after hot pressing was about 0.2 mm. The thickness of the metal layers after hot pressing were 0.7 mm, 0.5 mm, and 0.35 mm in the 5-, 7-, and 9-layer composite, respectively.

Figure 4:
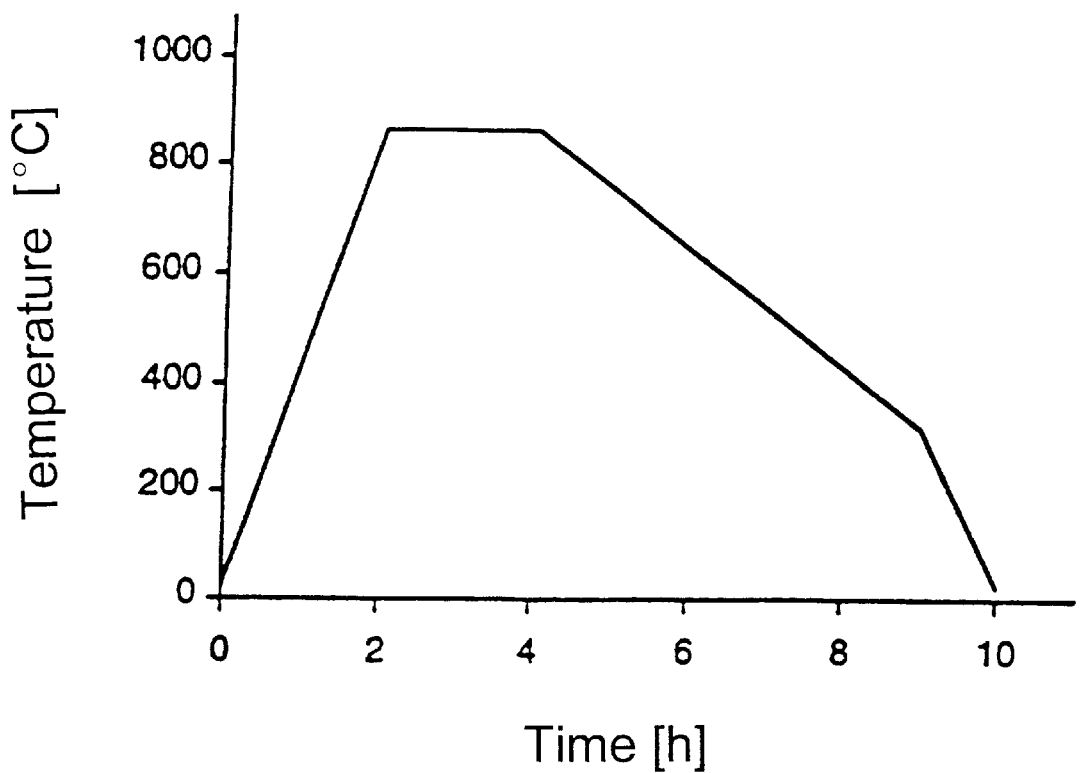
FIG. 4 is a graph showing the heat treatment cycle used for optimizing the magnetic properties of the material of Example 1.
Figure 5:
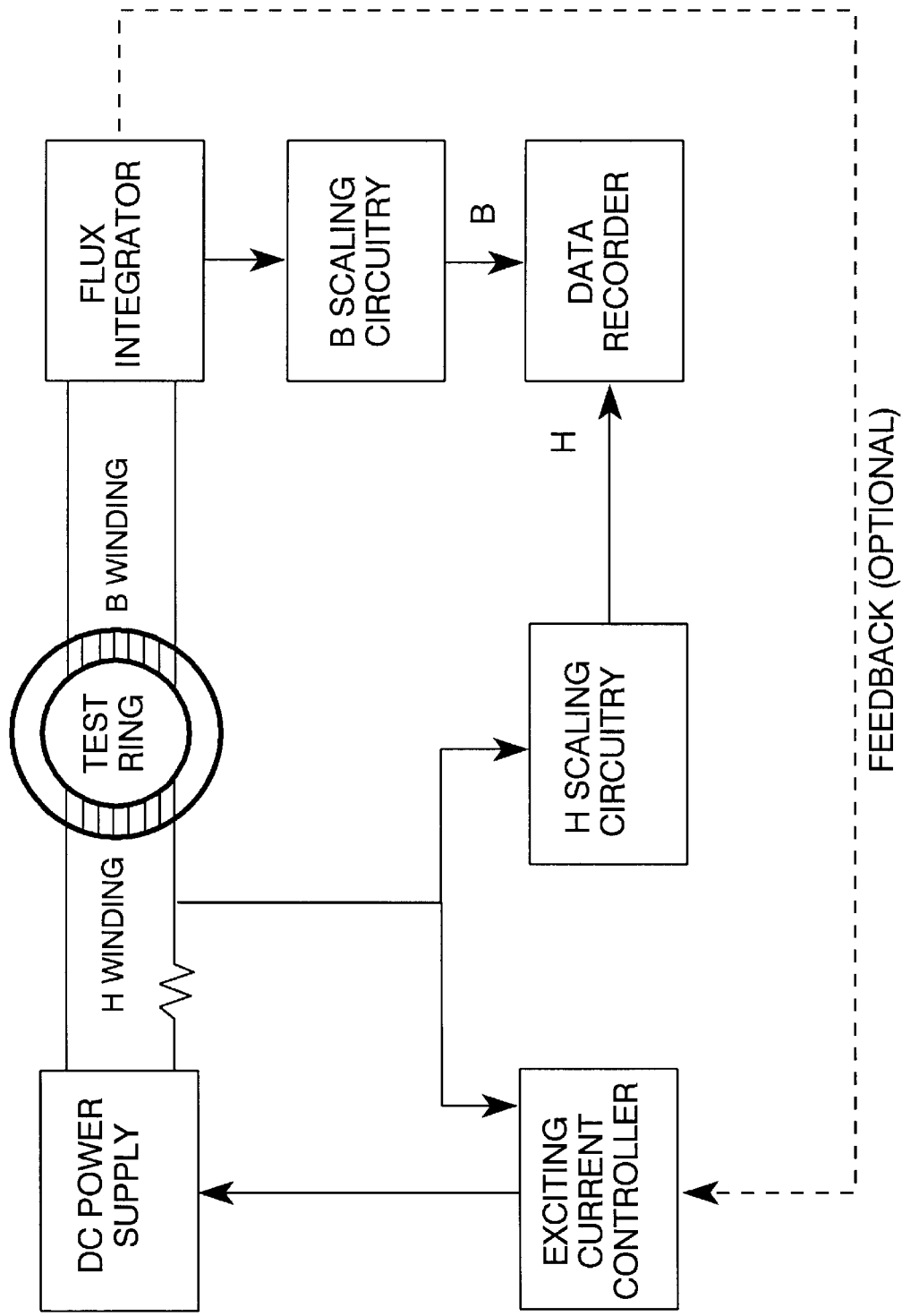
FIG. 5 is a block diagram of the apparatus used for measuring the DC magnetic properties of a laminated composite of the invention as illustrated in Example 1.
Figure 6:
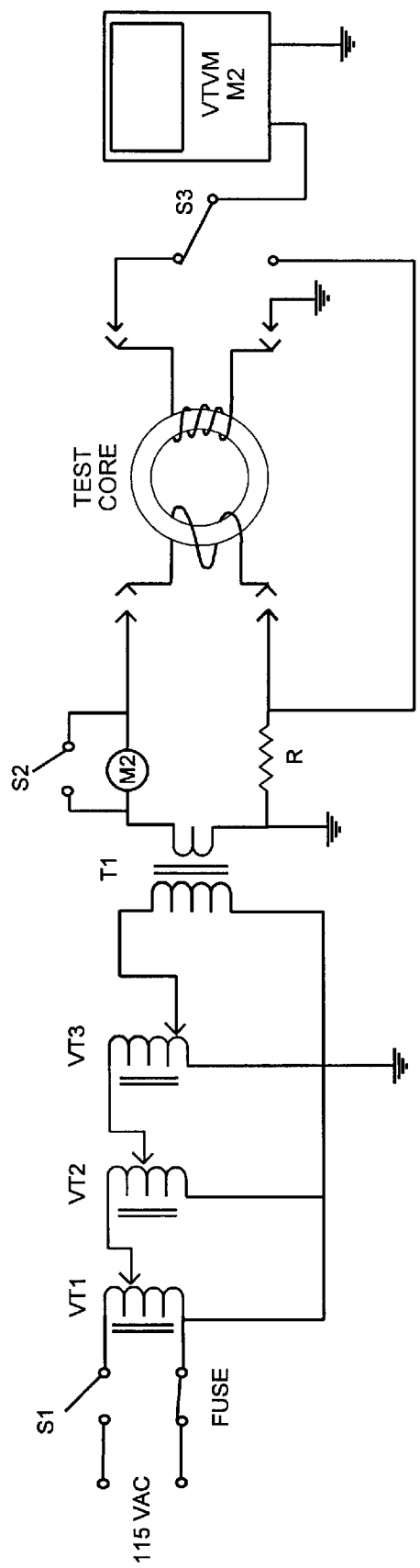
FIG. 6 is a schematic diagram of the test apparatus used for measuring the AC magnetic properties of the material in Example 1.

The hot pressed composite sandwiches were machined into 1-mm-thick rings having 2.03 cm inner diameter and 2.54 cm outer diameter. The rings were heat treated in vacuum (following the cycle in FIG. 4), in order to optimize magnetic properties. DC magnetic properties were measured in accordance with the test setup in FIG. 5. The AC magnetic properties were determined using the test apparatus shown schematically in FIG. 6 in which T1 is an isolation, current-type step down transformer; VT1, VT2 and VT3 are autotransformers; M1 is an ammeter, demagnetizing current (0–5 A); S3 is a DPDT switch; R is a noninductive precision resistor; and M2 is a high impedance digital voltmeter. The test circuit in FIG. 6 is excited by a 115 VAC drive voltage. Driving and sensing windings were 75 and 50 turns, respectively. A maximum drive field of 220 Oe was employed to saturate the materials so that an accurate saturation magnetization ($B_s$) value could be measured. A lower strength field, 100 Oe, was used for better accuracy when the coercive force values ($H_c$) were measured. Permeability, $\mu$, was determined by the initial curve and the AC core loss was measured at a frequency of 400 Hz with peak induction of 17 to 18 kG. The magnetic test results are summarized in FIG. 7.

EXAMPLE 2

Figure 8:
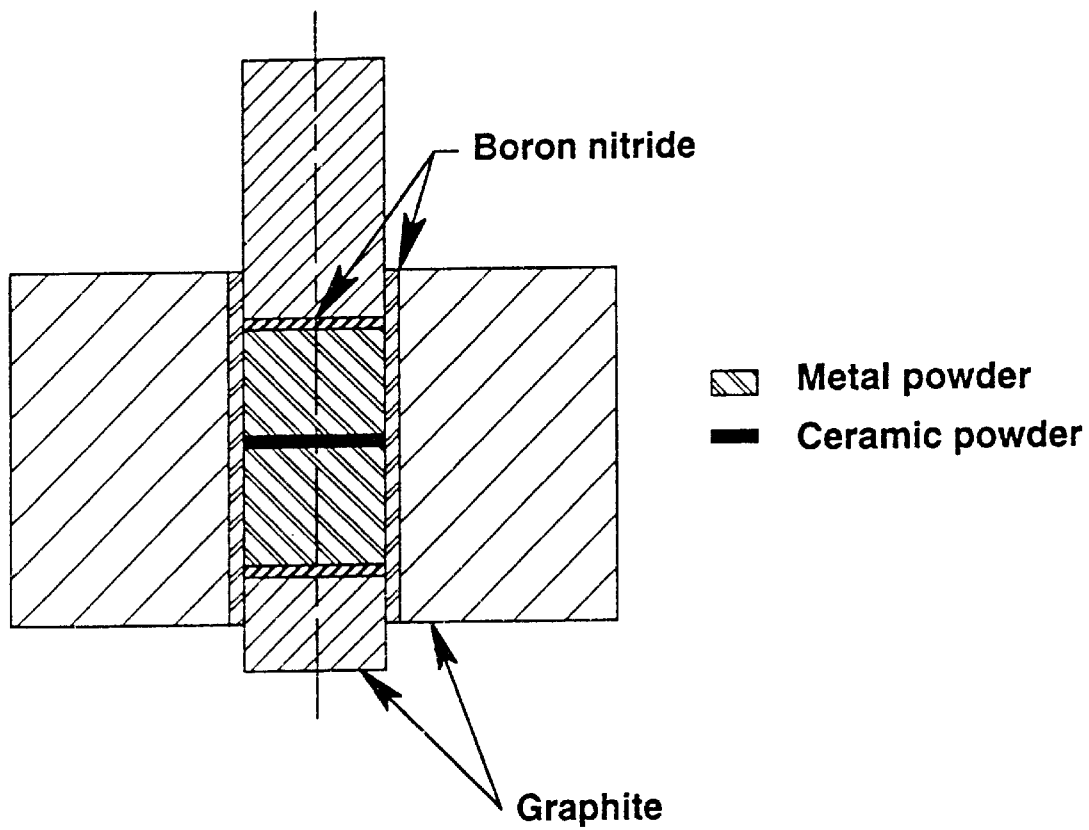
FIG. 8 is a cross-sectional view of a die assembly illustrating how the metal and ceramic powder layers were placed in order to hot press material for the bond strength samples in Example 2.
Figure 9:
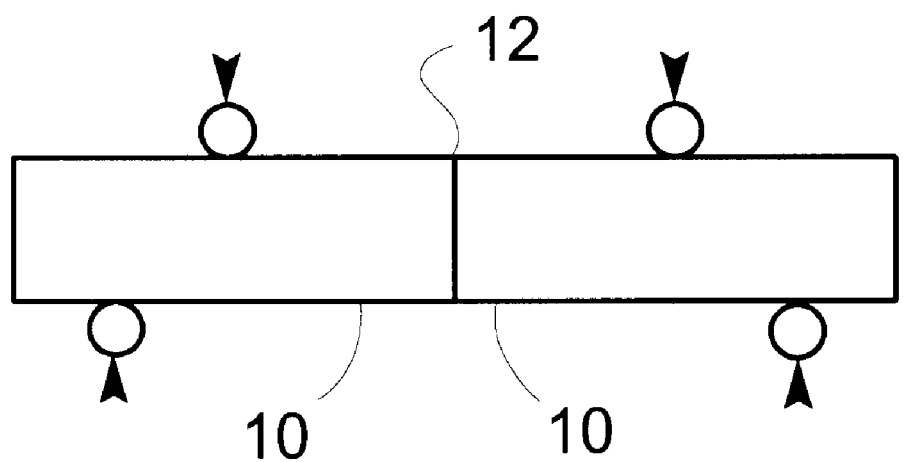
FIG. 9 is a diagram showing the test geometry for flexural tests conducted on a laminated composite according to the invention, and detailed in Example 2.

A series of cylindrical samples were fabricated by hot pressing to determine the strength of the bond formed between the Y-PSZ powder insulation layer and the magnetic alloy powder. A typical hot pressed sample was 3.8 cm diameter×3 cm long (1.5 inch×1.2 inch) and was comprised of ~150 micrometer-thick layer of yttria-partially stabilized zirconia powder between two 1.5 cm-thick layers of –325 mesh Hiperco® alloy 50A powder (Fe-49Co-2V wt. %, Carpenter Technology Corporation, Reading, Pa.). The arrangement of the powders in the boron nitride-lined graphite die was as illustrated in FIG. 8. The Y-PSZ powder (Grade TZ-3YS, Tosoh Corporation, Japan) had composition of 5.48 wt. % $Y_2O_3$-balance $ZrO_2$. The average particle size of the ceramic powder was 0.04 micrometers. Hot pressing was done in vacuum under an applied stress of 20.7 MPa (3 ksi), with a 30 minute hold at a final temperature of 1250° C. For comparison purposes, a second billet was made similar to the first, but without the ceramic powder layer. The hot-pressed billets were sliced parallel to their long axis to produce a series of 3.4-mm-thick coupons. The coupons were ground with a 220-grit-diamond abrasive wheel to a thickness of 2.5 mm, and one surface was polished with diamond pastes on a vibratory polisher. Polishing was accomplished in two steps, using diamond abrasive slurries of 6-micrometer and 3-micrometer-grit size. After polishing, the coupons were cut into 2.5×3.4×30 mm bars for flexural testing. The long edges of the tensile face of each bar were lightly beveled on a 6-$\mu$m-grit diamond lap. Four-point bend flexural tests were conducted at room temperature with a crosshead speed of 0.008 cm/s, and inner and outer spans of 6.35 mm and 19.05 mm, respectively. The test geometry is shown in FIG. 9. Groups of 6 bars of each material were tested. The average strength of the Hiperco 50A bars with the Y-PSZ layer across the center was 420.6±48 MPa (61±7 ksi). This value is 79% of the average strength of the bars from the billet of Hiperco 50A powder hot pressed without the ceramic interlayer.

As demonstrated by the foregoing examples, the invention disclosed herein can be used to fabricate a very strong, laminated composite material that has excellent AC and DC magnetic properties. The advantage in strength of this material over competing materials is even greater if the application requires service at elevated temperatures, such as in high-temperature magnetic bearings. Although there are believed to be no comparable commercial materials fabricated from metal powder layers bonded with ceramic, glass, or glass-ceramic powder layers, there are other magnetic materials produced by powder processing techniques. The materials of interest here are those intended for AC applications.

An important factor to consider in the evaluation of a magnetic material in an AC application is core loss, which is defined as the power dissipated in the core as it is exposed to alternating magnetic fields. Core loss is the sum of the hysteresis loss and eddy current loss. The following comments concern eddy current loss. When a ferromagnetic material is exposed to an alternating magnetic field, electrical currents, often referred to as eddy currents, are induced in the material. The result of these currents is an increase in heat generation within the core material. One method of reducing eddy currents, of course, is to use a series of laminations separated by a layer of insulation which also is generally the bonding agent.

Conventional sintered powder metallurgy components are unsuitable for AC applications because they have no barriers to prevent eddy current circulation. There are two commercial solutions to this problem. In the first, the so-called "dust" cores, the metal particles (typically iron) are chemically treated to produce an electrically insulating oxide layer on the powder surfaces prior to compaction. However, the strength of such compacts is very low. In the second method, developed by Hoeganaes Corporation, Riverton, N.J., iron particles are coated with a thermoplastic polymer prior to compaction at very high pressures. The Hoeganaes material has good magnetic properties, but only modest mechanical strength, even at room temperature. For example, their literature gives an as-pressed strength for their material (with 0.75 weight % plastic) as 124 MPa (18 ksi). After heat treatment at 315° C., the Hoeganaes material has a strength of 248 MPa (36 ksi), still much lower than the 421 MPa (61 ksi) of the material of this invention as given in Example 2.

The lower compaction pressure used in this process is also an advantage. For example, high density bodies have been achieved at pressures of only 20.7 MPa (3 ksi). It is known that this pressure is well within the capabilities of even the largest industrial hot isostatic presses.

We claim:

1. A method for manufacturing a laminated composite structure, comprising the steps of:
   assembling in a cavity alternating layers of uncoated metal powder particles and an inorganic bonding media, said inorganic bonding media selected from at least one of the group of powders consisting of a ceramic, glass, and glass-ceramic; and,
   applying heat to said alternating layers until the particles of each said layer of said metal powder are sintered together, each said layer of said inorganic bonding media is sintered, and said alternating sintered layers are bonded to one another to form a strong laminated composite structure.

2. The method according to claim 1 wherein the alternating layers are densified through the application of pressure using a uniaxial hot pressing process.

3. The method according to claim 2 wherein said cavity is defined by a graphite die.

4. The method according to claim 1 wherein said alternating layers are densified through the application of gas pressure to a flexible die using a hot isostatic pressing process.

5. The method according to claim 1 wherein said metal powder is a magnetic alloy powder.

6. The method according to claim 1 wherein said metal powder is a non-magnetic alloy powder.

7. The method according to claim 1 wherein said bonding media has a coefficient of thermal expansion which approximates that of said metal powder.

8. The method according to claim 1 wherein a surface of the particles comprising said metal powder are oxidized prior to the step of assembling said alternating layers in said cavity.

9. A laminated composite structure comprised of:
   alternating layers of uncoated metal powder particles and an inorganic bonding media selected from at least one of the group of powders consisting of a ceramic, glass, and glass-ceramic;

the particles comprising the metal powder sintered together and bonded into said laminated composite structure by the layers of sintered inorganic bonding media to form a strong composite structure.

10. The laminated composite structure according to claim 9 wherein said metal powder is a magnetic alloy powder.

11. The laminated composite structure according to claim 9 wherein said metal powder is a non-magnetic alloy powder.

12. A method for manufacturing a laminated composite structure, comprising the steps of:

assembling in a cavity alternating layers of metal powder particles and an inorganic bonding media, said inorganic bonding media selected from at least one of the group of powders consisting of a ceramic, glass, and glass-ceramic; and, applying heat to said alternating layers until the particles of each said layer of said metal powder is sintered into a contiguous metallic layer, each said layer of said inorganic bonding media is sintered, and said alternating sintered layers are bonded into said laminated composite structure by the layers of sintered inorganic bonding media to one another to form a strong laminated composite structure.

13. A laminated composite structure comprised of:

alternating layers of metal powder particles and an inorganic bonding media selected from at least one of the group of powders consisting of a ceramic, glass, and glass-ceramic;

the metal powder particles sintered together and forming a contiguous metallic layer which is bonded into said laminated composite structure by the layers of sintered inorganic bonding media to form a strong composite structure.

* * * * *